(12) United States Patent
Sun et al.

(10) Patent No.: US 12,142,404 B2
(45) Date of Patent: Nov. 12, 2024

(54) HARD-MAGNET L10-CoPt NANOPARTICLES ADVANCE FUEL CELL CATALYSIS

(71) Applicant: Brown University, Providence, RI (US)

(72) Inventors: Shouheng Sun, East Greenwich, RI (US); Junrui Li, Pullman, WA (US)

(73) Assignee: BROWN UNIVERSITY, Providence, RI (US)

( * ) Notice: Subject to any disclaimer, the term of this patent is extended or adjusted under 35 U.S.C. 154(b) by 710 days.

(21) Appl. No.: 17/284,318

(22) PCT Filed: Oct. 15, 2019

(86) PCT No.: PCT/US2019/056309
§ 371 (c)(1),
(2) Date: Aug. 23, 2021

(87) PCT Pub. No.: WO2020/077359
PCT Pub. Date: Apr. 16, 2020

(65) Prior Publication Data
US 2022/0069317 A1    Mar. 3, 2022

Related U.S. Application Data

(60) Provisional application No. 62/745,003, filed on Oct. 12, 2018.

(51) Int. Cl.
*H01F 1/047* (2006.01)
*B22F 1/054* (2022.01)
(Continued)

(52) U.S. Cl.
CPC .............. *H01F 1/068* (2013.01); *B22F 1/054* (2022.01); *B22F 1/145* (2022.01); *B22F 1/17* (2022.01);
(Continued)

(58) Field of Classification Search
CPC ........ H01F 1/047; H01F 1/68; H01F 41/0253; H01M 4/925; B22F 1/054; B22F 1/145
See application file for complete search history.

(56) References Cited

U.S. PATENT DOCUMENTS 7,286,324 B2 * 10/2007 Yasui ....................... G11B 5/84
                                                       428/817
8,864,045 B1 * 10/2014 Jiang ....................... C01B 21/06
                                                       423/604
(Continued)

FOREIGN PATENT DOCUMENTS

WO      2018187609 A1    10/2018

OTHER PUBLICATIONS

Li et al., Fe Stabilization by Intermetallic L10-FePt and Pt Catalysis Enhancement in L10-FePt/Pt Nanoparticles for Efficient Oxygen Reduction Reaction in Fuel Cells, Brookhaven National Laboratory, Feb. 2018.
(Continued)

*Primary Examiner* — Cam N. Nguyen
(74) *Attorney, Agent, or Firm* — ADLER POLLOCK & SHEEHAN P.C.

(57) ABSTRACT

A method includes converting ~9 nm soft-magnet A1—CoPt into a hard-magnet $L1_0$-CoPt, acid etching the hard-magnet $L1_0$-CoPt, and annealing the acid etched hard-magnet $L1_0$-CoPt to generate a $L1_0$-CoPt/Pt catalyst.

6 Claims, 11 Drawing Sheets

(51) Int. Cl.
  *B22F 1/145* (2022.01)
  *B22F 1/17* (2022.01)
  *H01F 1/06* (2006.01)
  *H01F 41/02* (2006.01)
  *H01M 4/92* (2006.01)
  *H01M 8/10* (2016.01)

(52) U.S. Cl.
  CPC ......... *H01F 1/047* (2013.01); *H01F 41/0253* (2013.01); *H01M 4/925* (2013.01); *H01M 2008/1095* (2013.01)

(56) References Cited

U.S. PATENT DOCUMENTS

| | | | | |
|---|---|---|---|---|
| 9,101,915 | B2* | 8/2015 | Lopez | H01M 4/921 |
| 9,608,278 | B2* | 3/2017 | Hayden | H01M 4/925 |
| 9,614,228 | B2* | 4/2017 | Hayden | H01M 4/925 |
| 9,634,332 | B2* | 4/2017 | Hayden | H01M 4/925 |
| 9,837,668 | B2* | 12/2017 | Cerri | H01M 4/8657 |
| 10,326,146 | B2* | 6/2019 | Mukherjee | H01M 4/921 |
| 2017/0069412 | A1* | 3/2017 | Strouse | B22F 1/17 |

OTHER PUBLICATIONS

Bian et al., Growth mechanism and magnetic properties of monodisperse L10-Co(Fe)Pt@C core-shell nanoparticles by one-step solid-phase synthesis, Nanoscale, vol. 7, Nov. 21, 2014, pp. 975-980.

Li et al., Hard-Magnet L10-CoPt Nanoparticles Advance Fuel Cell Catalysis, Joule, vol. 3, Jan. 16, 2019, pp. 124-135.

International Search Report and Written Opinion for PCT/US2019/056309 dated Jan. 2, 2020.

Li , et al., "Hard-Magnet L10-CoPt Nanoparticles Advance Fuel Cell Catalysis", Joule, vol. 3, Supplemental Information, Jan. 16, 2019, 42 pages.

* cited by examiner

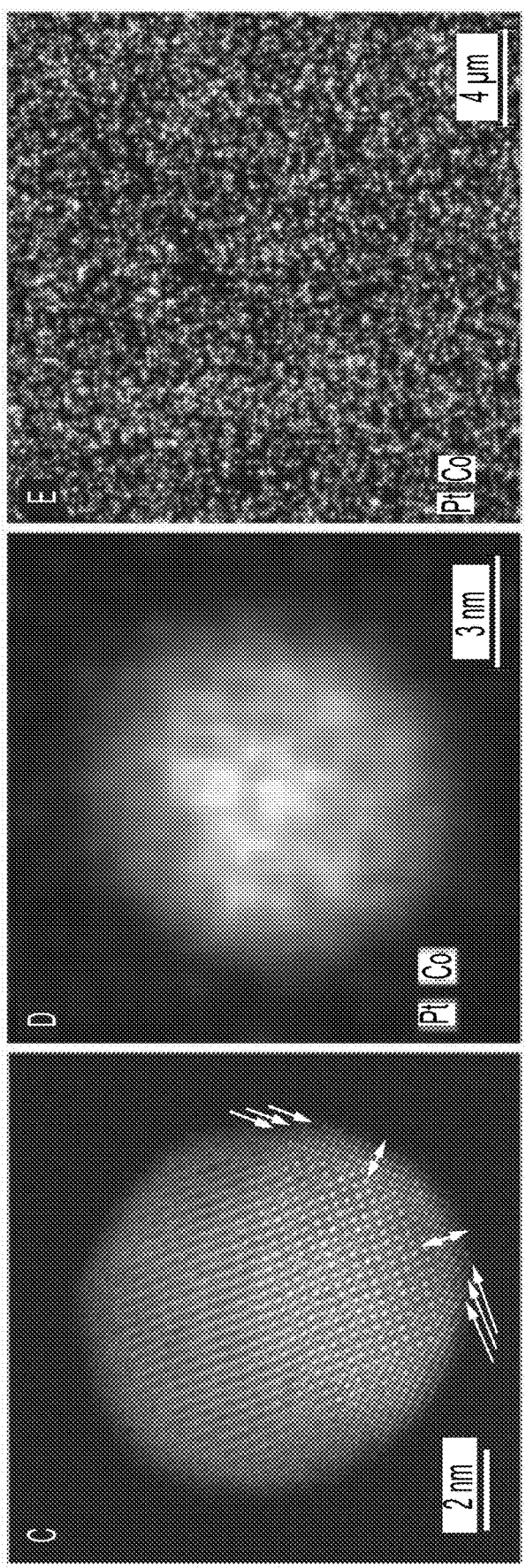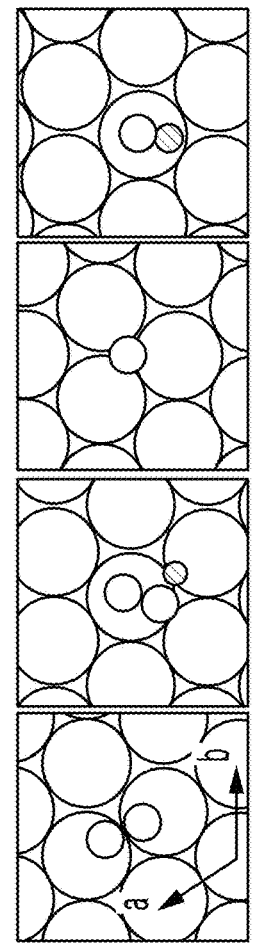

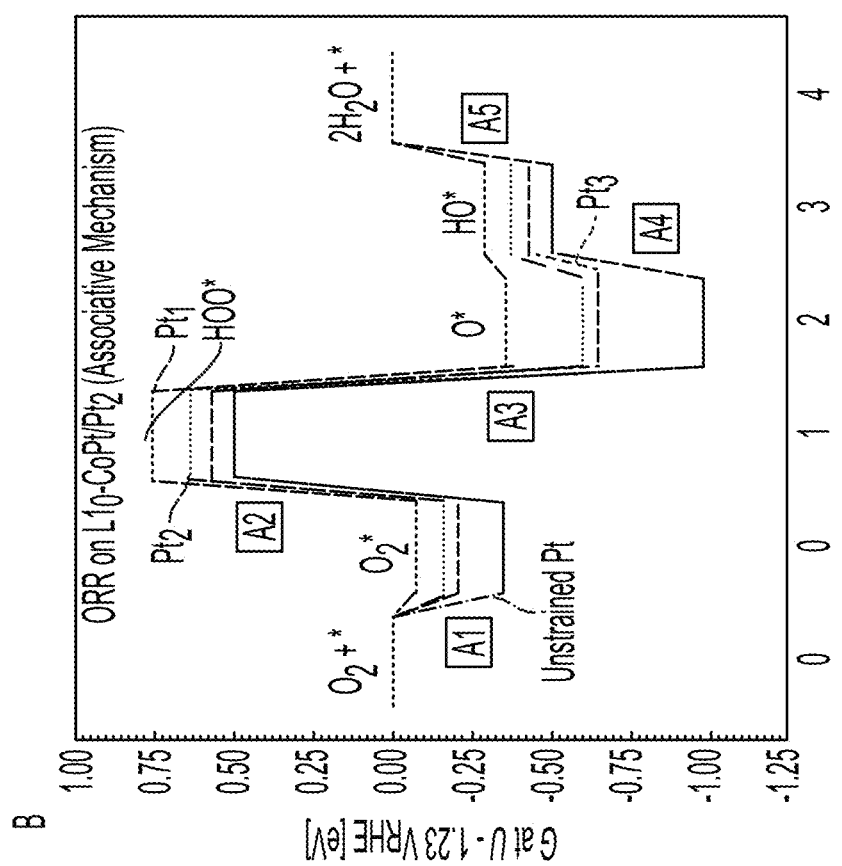

HARD-MAGNET L1₀-CoPt NANOPARTICLES ADVANCE FUEL CELL CATALYSIS

CROSS REFERENCE TO RELATED APPLICATIONS

This application is a national phase filing under 35 U.S.C. § 371 of International Application No. PCT/US2019/056309 filed Oct. 15, 2019, which claims benefit from U.S. Provisional Patent Application Ser. No. 62/745,003, filed Oct. 12, 2018, the entire contents of which are hereby incorporated by reference herein.

STATEMENT REGARDING GOVERNMENT INTEREST

None.

BACKGROUND OF THE INVENTION

The present invention relates generally to proton exchange membrane fuel cells (PEMFCs), and more particularly to a hard-magnet $L1_0$-CoPt nanoparticles advance fuel cell catalysis.

In general, proton exchange membrane fuel cells (PEMFCs) are light-weighted, sustainable and clean power sources that offer much promise for renewable energy applications. Nanostructured platinum (Pt) is the essential catalyst component to catalyze the oxygen reduction reaction (ORR) in PEMFCs. To address the Pt abundance issue and to enhance Pt catalysis, Pt is often alloyed with a transition metal (M) (M=Fe, Ni, Co and so forth). Despite some impressive ORR activities demonstrated on MPt so far, the stabilization of M in the MPt alloy remains challenging in an oxidizing and acidic ORR condition.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method including converting ~9 nm soft-magnet A1-CoPt into a hard-magnet $L1_0$-CoPt, acid etching the hard-magnet $L1_0$-CoPt, and annealing the acid etched hard-magnet $L1_0$-CoPt to generate a $L1_0$-CoPt/Pt catalyst.

In another aspect, the invention features a structure including a core/shell structured $L1_0$-CoPt/Pt NPs with a tetragonal intermetallic hard-magnet CoPt core, and a Pt shell in 2-atom thick Pt-shell.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIGS. 4C, 4D and 4E are exemplary graphs.
FIG. 5A illustrates an exemplary image.
FIGS. 5B, 5C, 5D and 5E illustrate exemplary graphs.

DETAILED DESCRIPTION

Figure 1A:
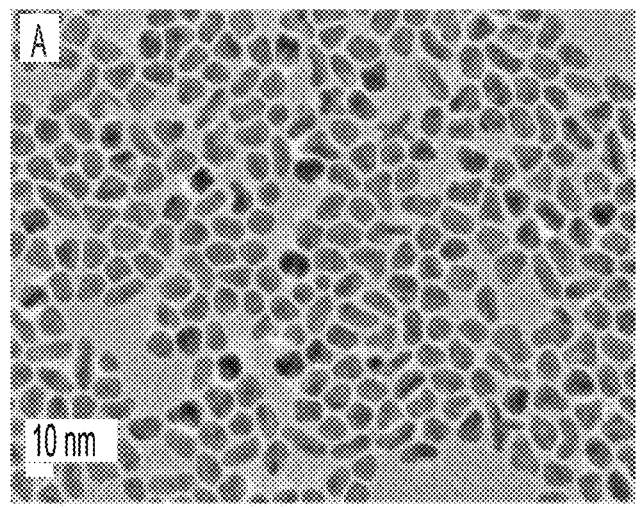
FIGS. 1A and 1B are exemplary images.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In part, the present invention is a method of producing hard-magnet core/shell $L1_0$-CoPt/Pt nanoparticles as a highly active and durable catalyst for the ORR in fuel cells. Its catalytic performance surpasses the activity and durability targets set by the U.S. Department of Energy. The $L1_0$-CoPt/Pt is a practical catalyst for uses in proton exchange membrane fuel cells (PEMFCs).

The nanostructured Pt remains an essential component in proton exchange membrane fuel cells (PEMFCs). As Pt is not abundant in nature, any attempts to scale up the production of PEMFCs must minimize the use of Pt. The US Department of Energy (DOE) set technical targets on mass activity (MA) of 0.44 A/mgPt at 900 mViR-free with <40% loss in initial activity after 30,000 cycles in PEMFCs by year 2020. This has triggered intensive research to seek approaches to improve Pt catalytic activity and stability. One common strategy explored is to alloy Pt with a first-row transition metal (M), as highlighted recently in PtNi-based nanostructures, Mo-doped $Pt_3Ni_5$, as well as core/shell structured $PtPb/Pt_6$, and $Pt_3Co/Pt_7$. The incorporation of smaller M atoms in the Pt-based alloy brings beneficial strain and alloy effects that are crucial to improving the oxygen reduction reaction (ORR) performance of an MPt catalyst. Despite some much improved ORR activities demonstrated, the MPt alloys are commonly prepared in cubic (fcc-type) solid solution structures and have limited ability to stabilize M under the acidic ORR conditions, which compromises the benefits brought by M in the MPt structures. Moreover, past ORR tests were often performed in the liquid half-cells at room temperature, not in the membrane electrode assembly (MEA) at 80° C. that is more relevant to the fuel cell operation.11

In searching of a strategy to stabilize M in the MPt structure against uncontrolled M leaching under the PEMFC conditions, intermetallic $L1_0$-structured FePt have attracted much attention. Different from the cubic intermetallic L12_mpt₃, such as $Pt_3Co_6$, $Pt_3Cu$ and $Pt_3Fe$ NPs, the tetragonal $L1_0$-FePt has the Fe:Pt in near 1:1 ratio, and Fe (3d) and Pt (5d) atomic orbitals are coupled strongly along the crystallographic c-direction, making the FePt a hard magnet with Fe being efficiently stabilized against acid-etching. As one of a few examples reported on hard-magnet $L1_3$-MPt for ORR2, 8 nm $L1_0$-FePt nanoparticles (NPs) were found to function as a stable ORR catalyst in the membrane electrolyte assembly (MEA) at 80° C. However, this L13-FePt NP catalyst has a MA of only 0.21 A/mgpt in the MEA test condition, 14 which failed to meet the DOE 2020 activity target (0.44 A/mgpt). Moreover, the relevance of FePt to fuel cell applications is limited due to the concern on the Fe-catalyzed Fenton reaction and its negative impact on the stability of some key fuel cell components 26. Therefore, a practical catalyst with satisfying catalytic performance in MEA for real-world fuel cell applications still needs to be demonstrated.

Herein, we present intermetallic and strongly ferromagnetic $L1_0$-CoPt/Pt NPs with 2-3 atomic layers of Pt shell as an active and durable ORR catalyst for fuel cell applications. The hard-magnet $L1_0$-CoPt NP catalyst is much more efficient in stabilizing Co than the soft-magnet Al—CoPt under the ORR conditions relevant to PEMFCs. The MA of the $L1_0$-CoPt reaches 2.26 A/mgpt with 18% loss after 30,000 cycles at 60° C. in the liquid half-cell, and 0.56 A/mgpt with 19% loss at 80° C. in the MEA after 30,000 cycles, exceeding the DOE 2020 target on both Pt activity and durability. Density Functional Theory (DFT) calculations suggest that the 2 atom-thick Pt shell is subject to a −4.50%/−4.25% biaxial strain and a significant ligand effect of Co, further weakening the binding of all oxygenated intermediates on Pt surface and enhancing its ORR catalysis.

NP Synthesis and Structural Characterizations

Oleylamine (OAm) is used as both solvent and reducing agent to synthesize CoPt NPs. Transmission electron microscopy (TEM) images show that these NPs possess a "cashew"-like shape and have an average dimension of 8.9±0.8 nm (see FIG. 1A). High resolution-TEM (HR-TEM) images show the distance of 0.216 nm and distance of 0.185 nm fringes of Al—CoPt. This indicates that Co and Pt are uniformly alloyed. Inductively coupled plasma atomic emission spectroscopy (ICP-AES) analysis indicated the ratio of Co:Pt is 49:51. We also monitored the NP size/shape/composition evolution during the NP growth process using TEM and ICP. The reacting solution was observed to turn slightly black around 170° C. due to the nucleation of Pt/Co. The NPs separated at 190° C. have a composition of ConPtai and a size of 2-3 nm, implying that Pt nucleates and grows faster at this early synthetic stage. The existence of Pt nuclei promotes the reductive decomposition of Co (acac)2 at temperature below 200° C. to form the CoPt alloy. Without Pt(acac)2, Co nucleation was not observed until the reaction temperature reached above 250° C. The "cashew"-like shape starts to form at 200° C. due to the increasing amount of Co deposited onto the seeding NPs, as indicated by the smaller lattice spacings compared to the pure Pt in the HR-TEM images. The reaction then proceeded to 300° C. with growth of NPs and finally reached a composition of $Co_{49}Pt_{51}$. The formation of this "cashew" shape should facilitate Co/Pt diffusion and Co/Pt ordering in the following annealing process.

Figure 1B:
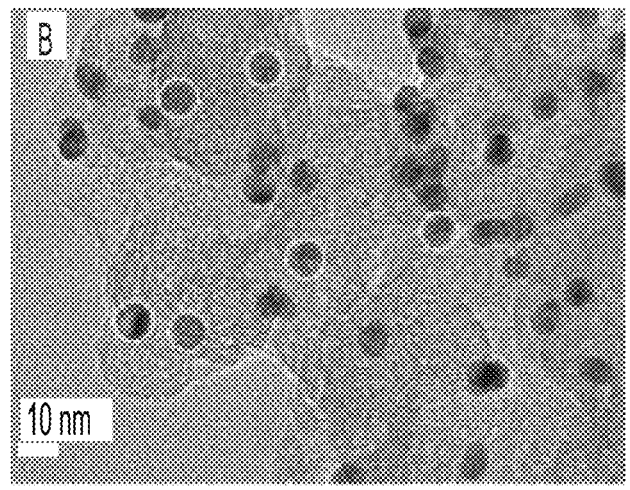
Figure 1C:
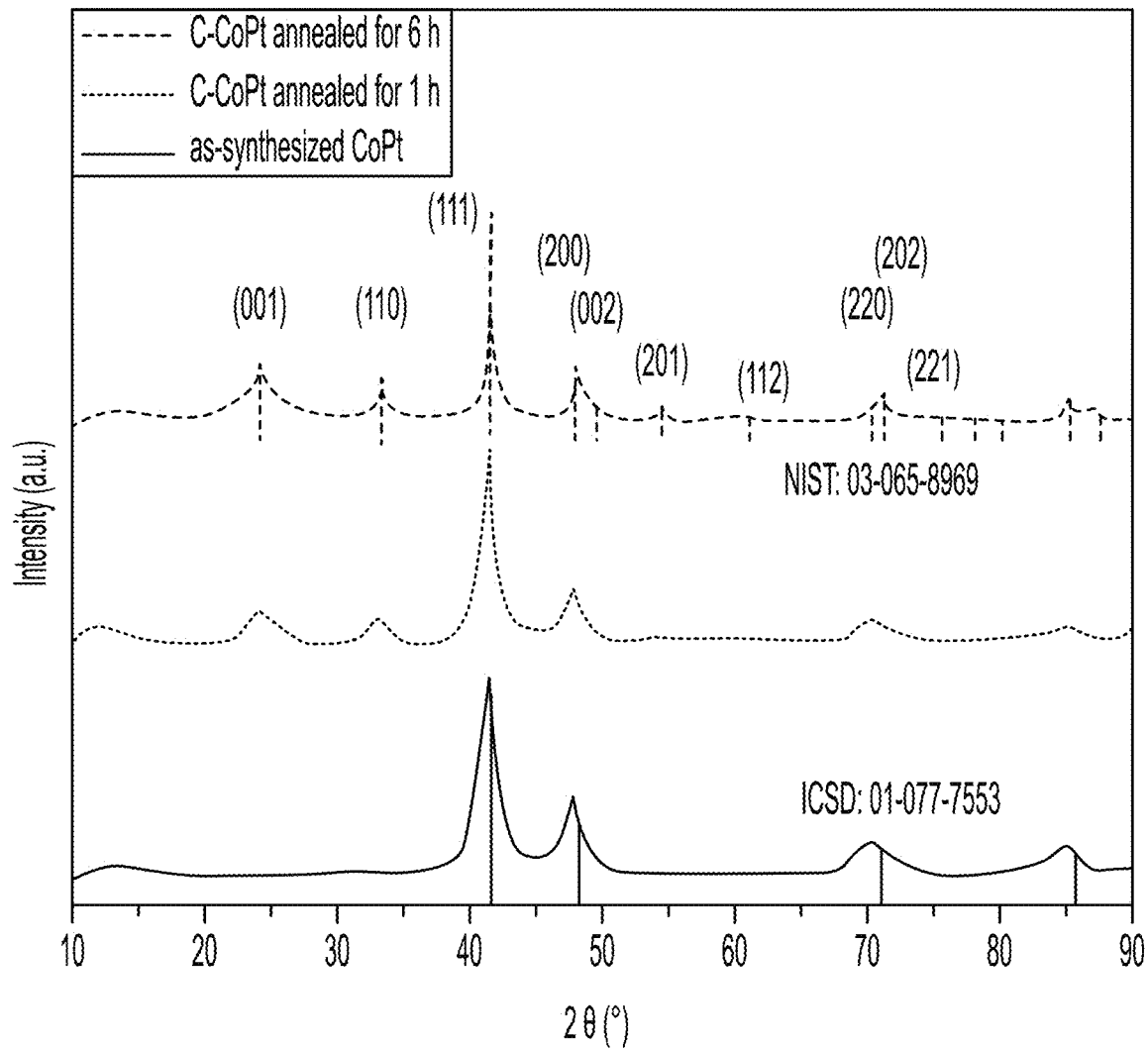
FIGS. 1C and 1D are exemplary graphs.
Figure 1D:
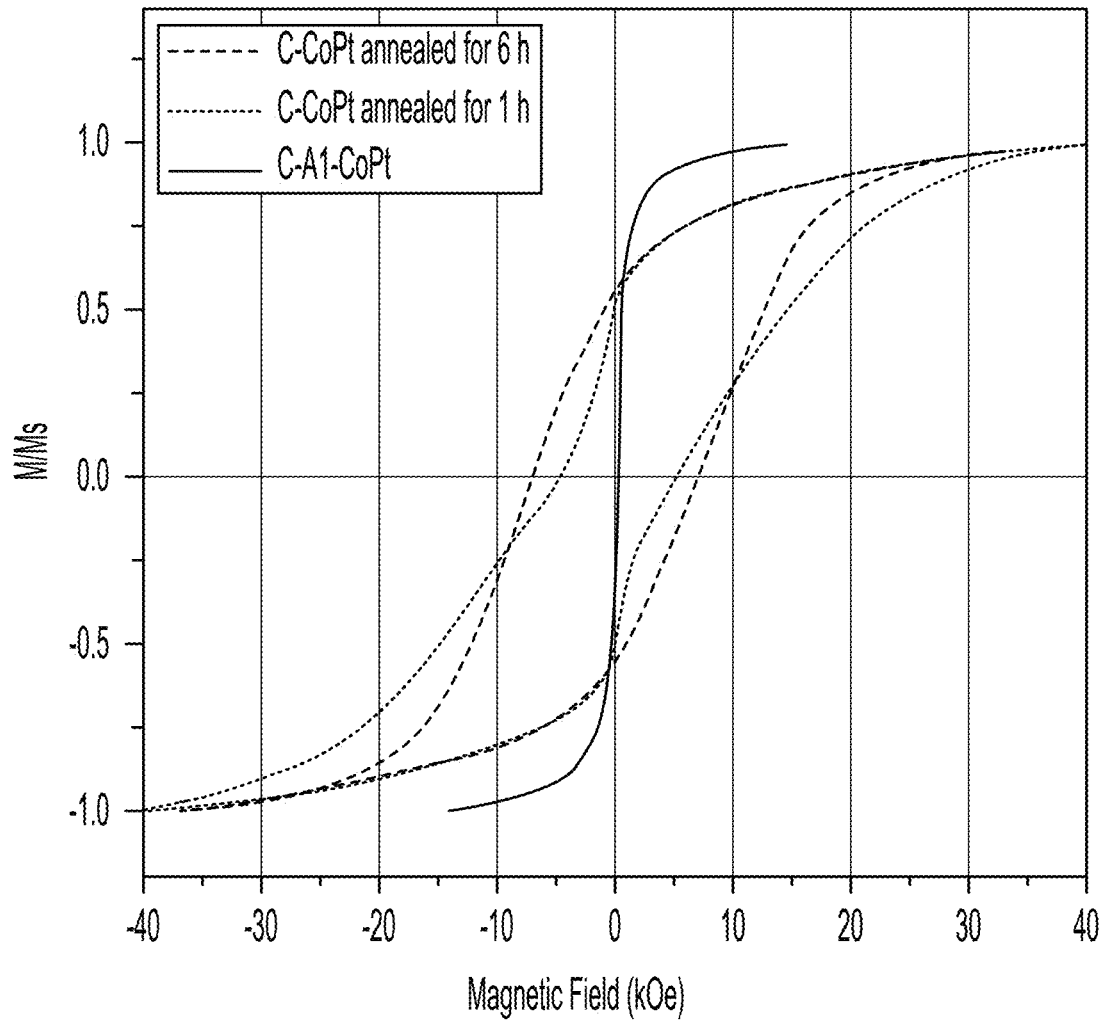

The as-synthesized CoPt NPs were supported on Ketjenblack EC-300J carbon (C) and annealed at 650° C. to be converted into $L1_0$-structure. After annealing at 650° C., the "cashew"-like shape was converted into the spherical shape, as shown in FIG. 1B. In the X-ray diffraction (XRD) patterns shown in FIG. 1C, the as-synthesized CoPt NPs exhibit Al-structure, and the carbon-support CoPt (C—CoPt) NPs annealed at 650° C. show additional peaks at 24.2° and 33.4° that are characteristic of $L1_0$-structure. The ordering degree of $L1_0$-structure (or ratio of $L1_0$-structure to Al-structure) is dependent on the annealing temperature and time. XRD patterns of the annealed C—CoPt NPs were refined and the ordering degree of $L1_0$-CoPt was evaluated by calculating the ratio of $I_{001}/I_{111}$. 1 h annealing at 650° C. resulted in $L1_0$-CoPt NPs with 55% $L1_0$-ordering, while 6 h annealing at 650° C. gave 88% $L1_0$-ordering, which here we define as fully ordered $L1_0$-CoPt, with the (111) diffraction peak shifting slightly to higher angles due to the improved $L1_0$-ordering and further lattice reduction compared to the Al-structure. The $L1_0$-ordering was also confirmed by magnetic hysteresis behaviors of the NPs shown in FIG. 1D. $L1_0$-CoPt obtained with 6 h 7 annealing is strongly ferromagnetic at room temperature with a smooth hysteresis loop and a magnetic coercivity of 7.1 kOe, while Al—CoPt is superparamagnetic with no coercivity. The hysteresis loop of C—CoPt obtained with 1 h annealing shows a two-phase behavior with a lower coercivity than the 6 h annealed one, indicating mixed phases of soft-magnet Al—CoPt and hardmagnet $L1_0$-CoPt. Compared to the previously reported $L1_0$-CoPt materials, which are either extremely large in size or with low ordering degrees, our sub-10 nm fully ordered $L1_0$-CoPt NPs with a high coercivity and one-phase magnetic behavior is the first ever produced. The improved CoPt structure transition from Al to $L1_0$ must be from the unique "cashew"-like shape obtained from our new synthesis, which facilitates Co/Pt inter-diffusion in the annealing condition. Another important feature of the new synthesis is that no MgO coating is needed to protect the NPs against sintering at the annealing temperature, making the process much convenient to prepare the $L1_0$-NPs for the ORR catalysis studies.

Figure 2:
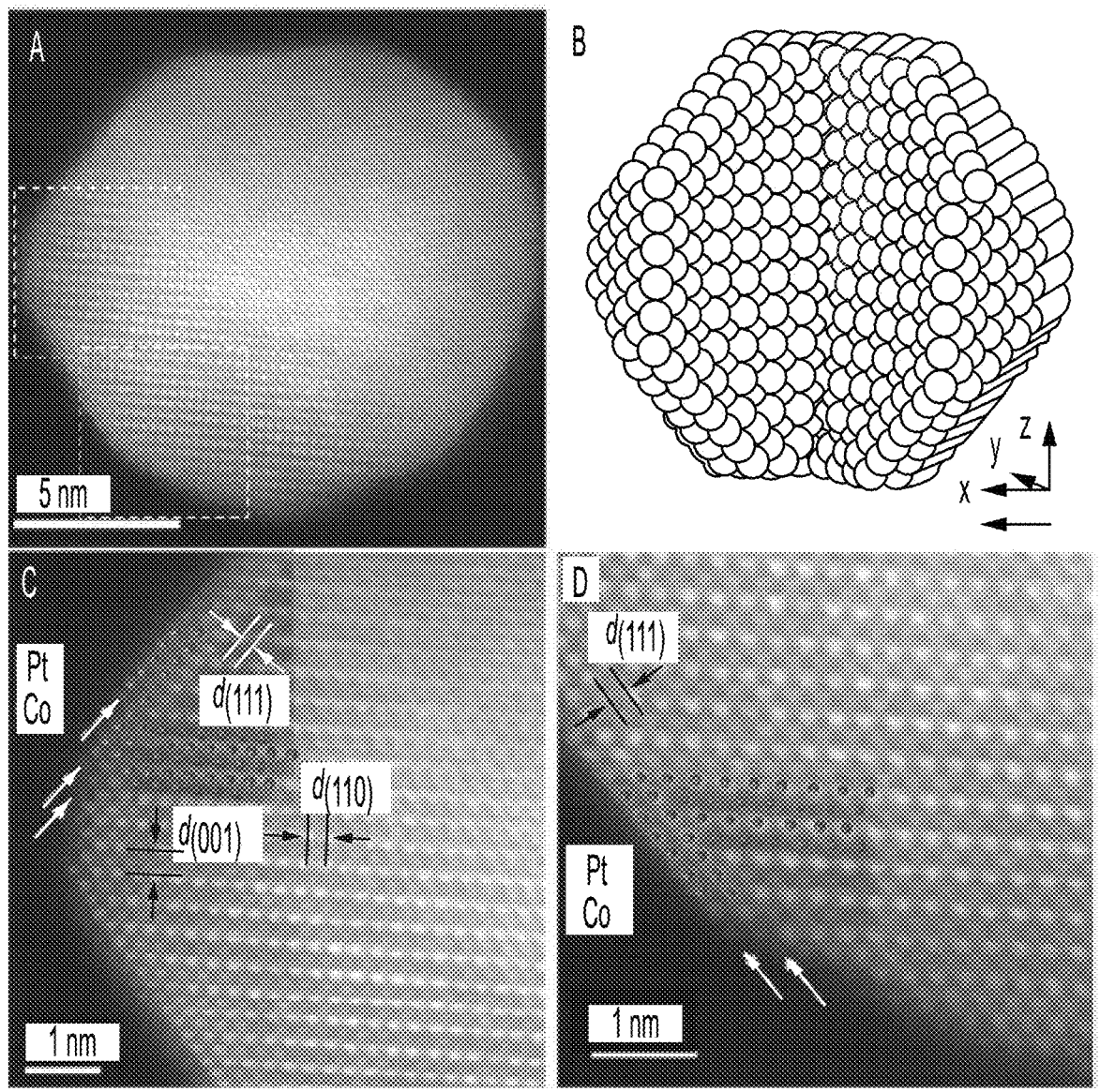
FIG. 2 illustrates exemplary images.

We converted the fully ordered $L1_0$-CoPt into the core/shell $L1_0$-CoPt/Pt through acid treatment and 400° C. annealing. Scanning transmission electron microscopy (STEM) images (see FIG. 2) show that the core/shell structure is formed with the core containing alternative layers of Pt and Co and shell being 2-3 atomically thick of Pt. This further proves that $L1_0$-CoPt structure is efficient in protecting Co against acid etching with only those at the very surface being removed from the treatment. ICP analysis indicates that the Co composition in $L1_0$-CoPt starts at 49% and is stabilized at 44% during the 24 h etching period using 0.1 M $HCLO_4$, in air, 60° C. As a comparison, the A1-CoPt loses most of Co (from 49% to 15% in only a 7 h etching period). In the core structure of the $L1_0$-CoPt/Pt, a high degree of $L1_0$-ordering is easily visible and the $L1_0$-CoPt core is uniformly surrounded by 2-3 atomic layers of Pt shell (FIG. 2C and FIG. 2D). The atoms in the Pt shell are constrained due to its epitaxial link with the $L1_0$-CoPt core. The geometric features of the $L1_0$-CoPt and $L1_0$-CoPt/Pt were further characterized by extended X-ray absorption fine structure (EXAFS). The Pt L3 edge and Co K edge spectra show that in the $L1_0$-CoPt/Pt, Pt-Pt distance is at 0.269 nm, much shorter than that of pure Pt (0.278 nm) and Co-Co at 0.265 nm is much longer than that of pure Co (0.251 nm), indicating the strong interaction between Pt and Co layers. Due to this strong interaction, Co is well-protected from oxidation as no obvious Co-O peak is visible. The Co-Co coordination number (CN) is much smaller compared to Co-Pt in both $L1_0$-CoPt and $L1_0$-CoPt/Pt, suggesting that Co-Co bond is localized in 2-dimension, whereas Co-Pt bond is in 3-dimension.

ORR Tests in the Liquid Half-Cell

Figure 3A:
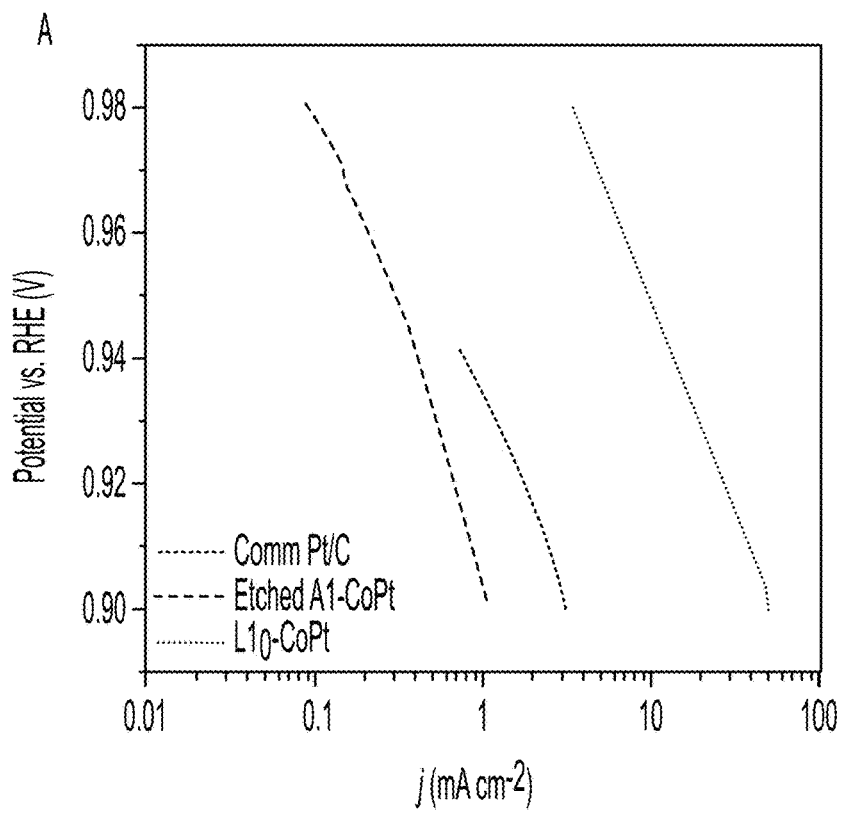
FIGS. 3A, 3B, 3C, 3D, 3E and 3F are exemplary graphs.
Figure 3B:
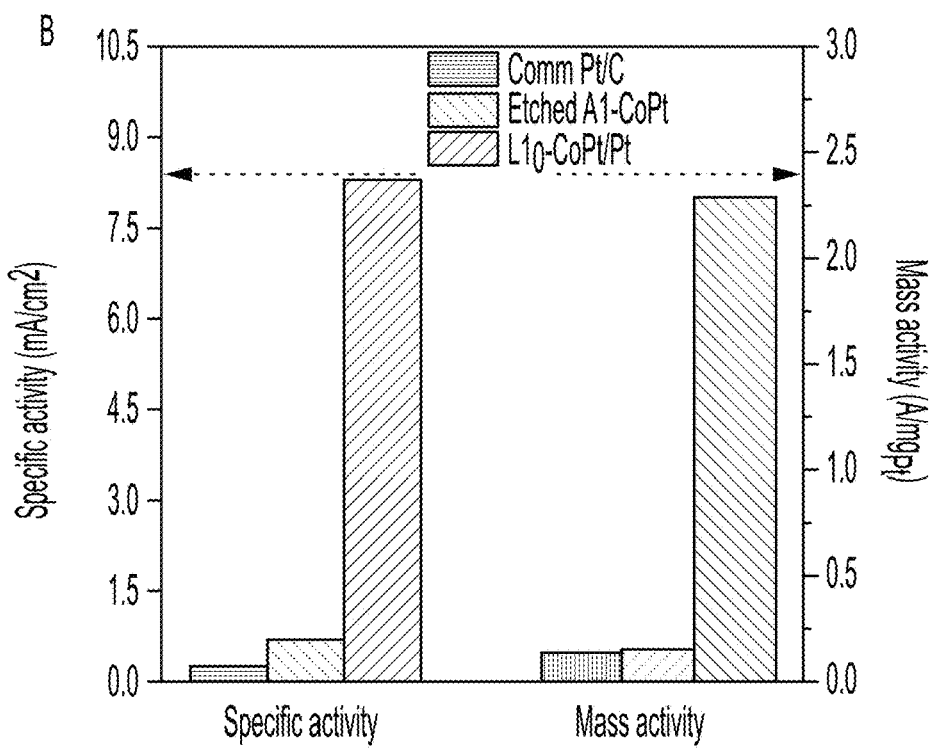
Figure 3C:
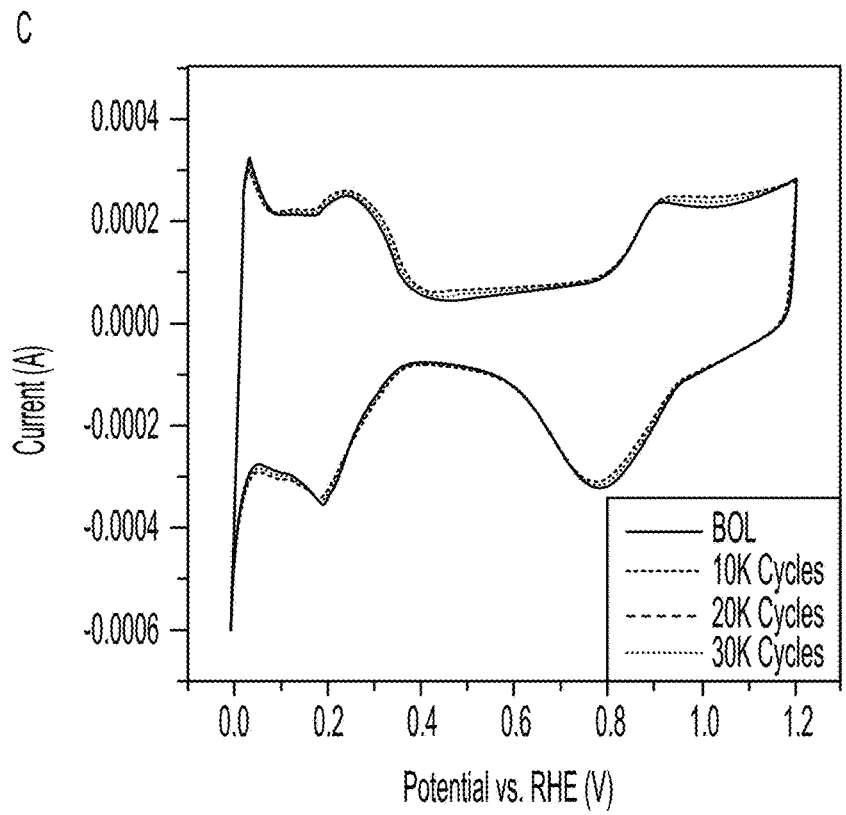
Figure 3D:
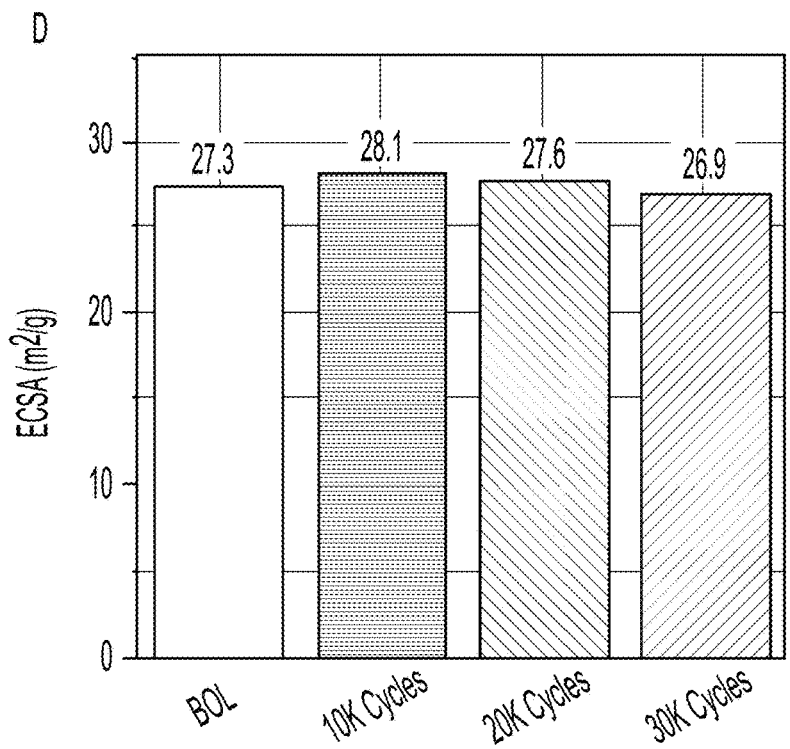
Figure 3E:
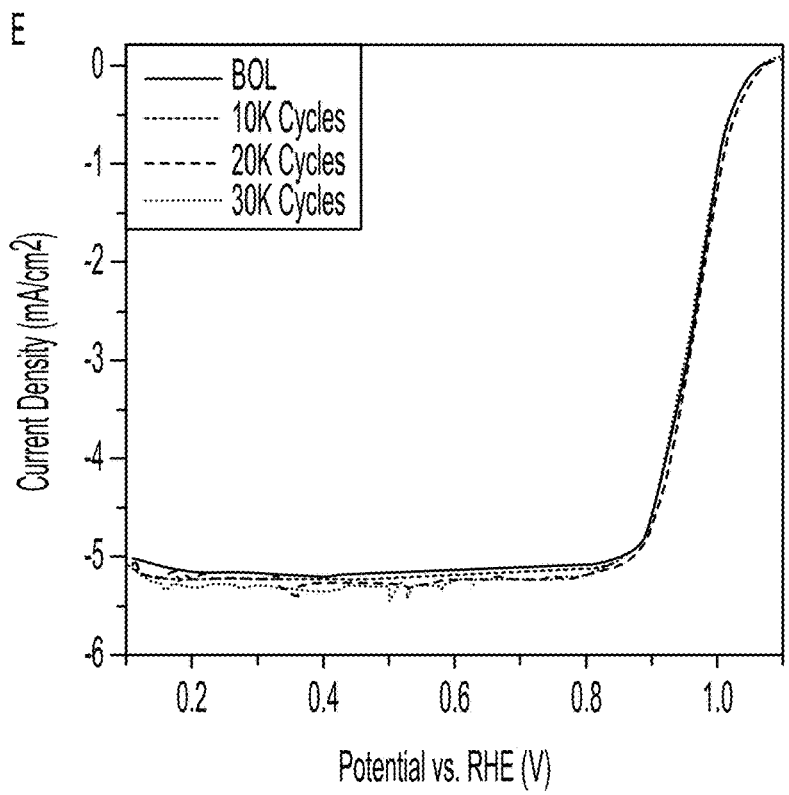
Figure 3F:
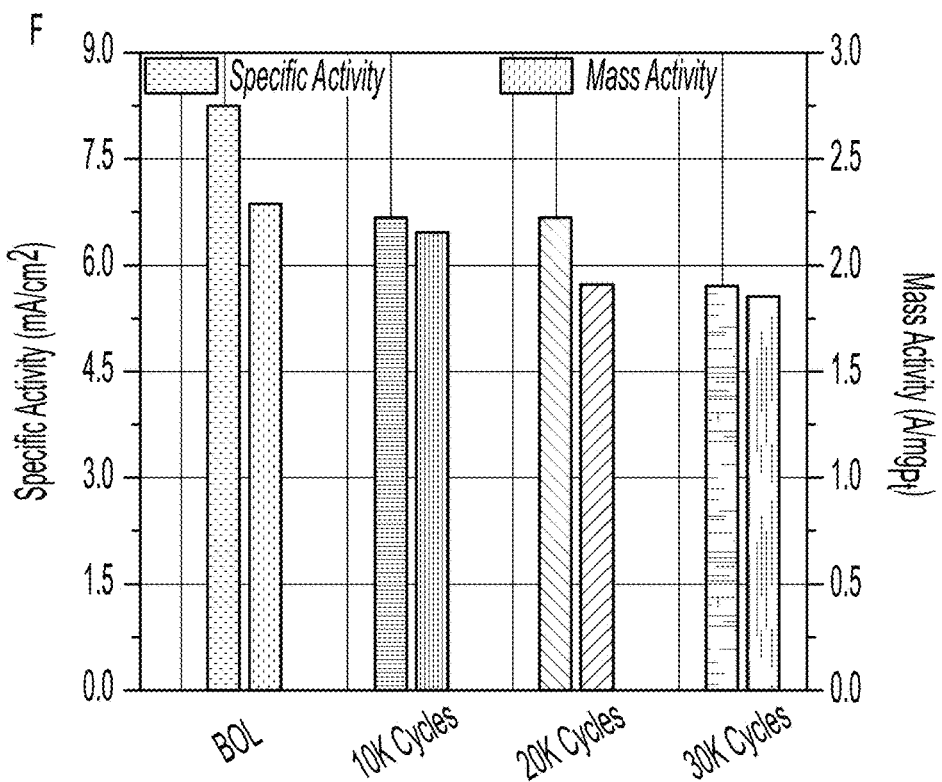

Cyclic voltammetry (CV) and linear scanning voltammetry (LSV) are used to evaluate the ORR performance of the CoPt/Pt catalysts at room temperature. The Tafel plots generated by plotting potential vs. kinetic current density (j) in FIG. 3A have slopes of 86, 75 and 66 mV/decade on etched Al—CoPt, commercial Pt/C (comm Pt/C) and $L1_0$-CoPt/Pt catalysts, respectively, indicating that $L1_0$-CoPt/Pt has much improved ORR kinetics. FIG. 3B shows the specific activities (SA) of 0.22, 0.70 and 8.26 mA/cm2, respectively, on comm Pt/C, etched Al—CoPt and $L1_0$-CoPt/Pt catalysts, and the MAs are 0.12, 0.15 and 2.26 A/mgpt respectively. The SA and MA of $L1_0$-CoPt/Pt are—38 times and—19 times respectively of those measured on comm Pt/C. In contrast to the significantly degraded ORR performance of comm Pt/C and etched Al—CoPt during the accelerated durability test (ADT) at 60° C. (FIG. S9), the CV curves obtained by $L1_0$-CoPt/Pt in FIG. 3C barely change after 30,000 ADT cycles and the electrochemical active surface area (ECSA, determined by the $H_{upd}$ method) maintains at a stable level with almost no loss at end-of-life (EOL) (FIG. 3D). The comm Pt/C shows the 85% drop and etched Al—CoPt shows the 41% drop in MA at EOL. In comparison, no obvious change is observed in ORR polarization curves (FIG. 3E) and the drop in MA/SA of $L1_0$-CoPt/Pt is only 18% at EOL (FIG. 3F). Considering that the $L1_0$-CoPt and the etched Al—CoPt have the same NP size, the demonstrated enhancement in ORR performance must arise from the $L1_0$-structure and stabilized Co that induces favored ligand and strain effects. We also obtained the ESCA of the $L1_0$-CoPt/Pt catalyst from the CO stripping method, which is larger than that from the H, pd method (37.1 m2/g vs 27.3 m2/g), implying suppression effect of sublayer Co on the $H_{upd}$ and the formation of "Pt skin" over CoPt core.31 We should note that CO stripping can cause surface changes in both composition and morphology of MPt NPs. Therefore, we chose to use the ESCA from the $H_{upd}$ method to present our specific activity data. The exceptional stability of $L1_0$-CoPt/Pt NPs during the ADT at 60° C. was confirmed by HR-TEM images, where $L1_0$-CoPt/Pt NPs show uniform size and dispersity without aggregation on carbon support at beginning-of-life (BOL) and EOL. Co and Pt are uniformly distributed throughout the NPs both at BOL and EOL, and Co content in $L1_0$-CoPt/Pt is changed from 43% at BOL and 39% at EOL during the 60° C. ADT. The intermetallic core structure is preserved after ADT. In comparison, the comm Pt/C (initial size is—2 nm) aggregated and sintered after the ADT.

MEA Tests in Fuel Cell

Figure 4A:
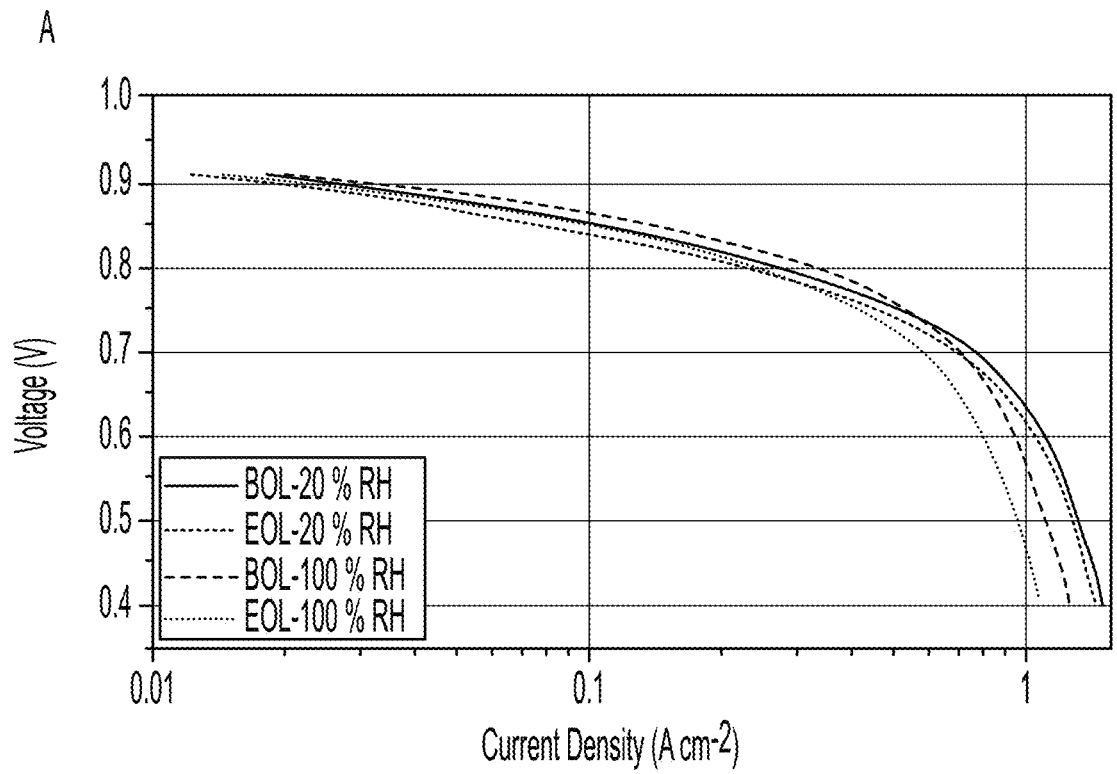
FIGS. 4A and 4B are exemplary graphs.
Figure 4B:
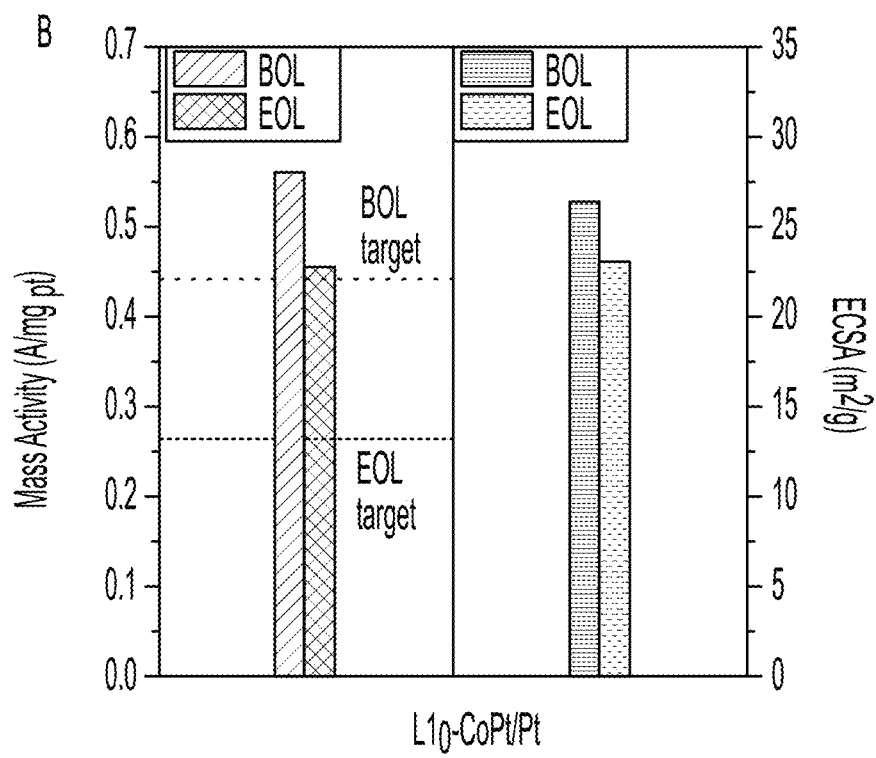

The excellent liquid half-cell ORR performance translates well into good MEA performance of $L1_0$-CoPt/Pt (8 wt % Pt content) at 80° C., as shown in FIG. 4A. We plotted the x-axis of polarization curves in logarithmic scale to highlight the low-current density region (<0.1 A/cm2), where the performance (voltage loss) is solely controlled by ORR kinetics on cathode catalysts. The Tafel slopes of the polarization curves tested at 100% RH are 63 mV/decade at BOL and 65 mV/decade at EOL, respectively, which is consistent with what were observed in the liquid half-cell results. This slope is smaller compared to the reported value of pure Pt (70 mV/decade) tested at 80° C. in the MEA, indicating the improved ORR kinetics of $L1_0$-CoPt/Pt. The $L1_0$-CoPt/Pt shows only slight drop after 30,000 ADT cycles via the current DOE/FCTT protocol. And the good catalytic performance was further confirmed by an excellent MA of 0.56 A/mgpt and superior durability with only 19% MA loss after 30,000 ADT cycles (FIG. 4B), which surpasses the DOE 2020 target on both MA (0.44 A/mgpt) and MA loss (<40%). The specific activities of $L1_0$-CoPt/Pt at BOL and EOL are 2.12 mA/cm2 and 1.97 mA/cm2, respectively. The ECSA (determined by $HW_p$ method) of the $L1_0$-CoPt/Pt changes slightly from 26.4 m2/g to 23.0 m2/g after the ADT, indicating that the NPs have good stability under the MEA condition. STEM image of $L1_0$-CoPt/Pt measured at EOL in the MEA test shows that the $L1_0$-structure and the thin Pt shell (2-3 atomic layers in thickness) are well preserved (FIG. 4C). Elemental mapping of a representative NP at EOL also confirms that a significant amount of Co is maintained in the core structure and a thin Pt shell surrounds the alloy core (FIG. 4D). A large-area elemental mapping of the MEA at EOL shows a good uniformity of Pt and Co composition throughout the MEA (FIG. 4E).

We also conducted the Hz-air polarization test at different relative humidity (RH) (logarithmic scale in FIG. 4A). When the cathode inlet RH was decreased from 100% to 20% (anode kept at 100% RH), $L1_0$-CoPt/Pt showed better performance in the high-current density region at both BOL and EOL with minimal loss in performance after ADT. This suggests that the performance drop in the high-current density region at 100% RH is due to the presence of excessive liquid water at high humidity hampering the effectiveness of $0_2$ mass transport, not the kinetic activity change of the catalyst. Among various MPt alloy catalyst reported thus far, highest MEA performance was from the dealloyed $PtNi_3$. However, it does suffer from significant loss of Ni after acid-etching (only ~15% Ni remained). Our work on $L1_0$-CoPt/Pt demonstrate the advantage of intermetallic structures in stabilizing Co and enhancing Pt catalysis for the ORR.

DFT Study of the $L1_0$-CoPt/Pt Catalysis

Figure 5E:
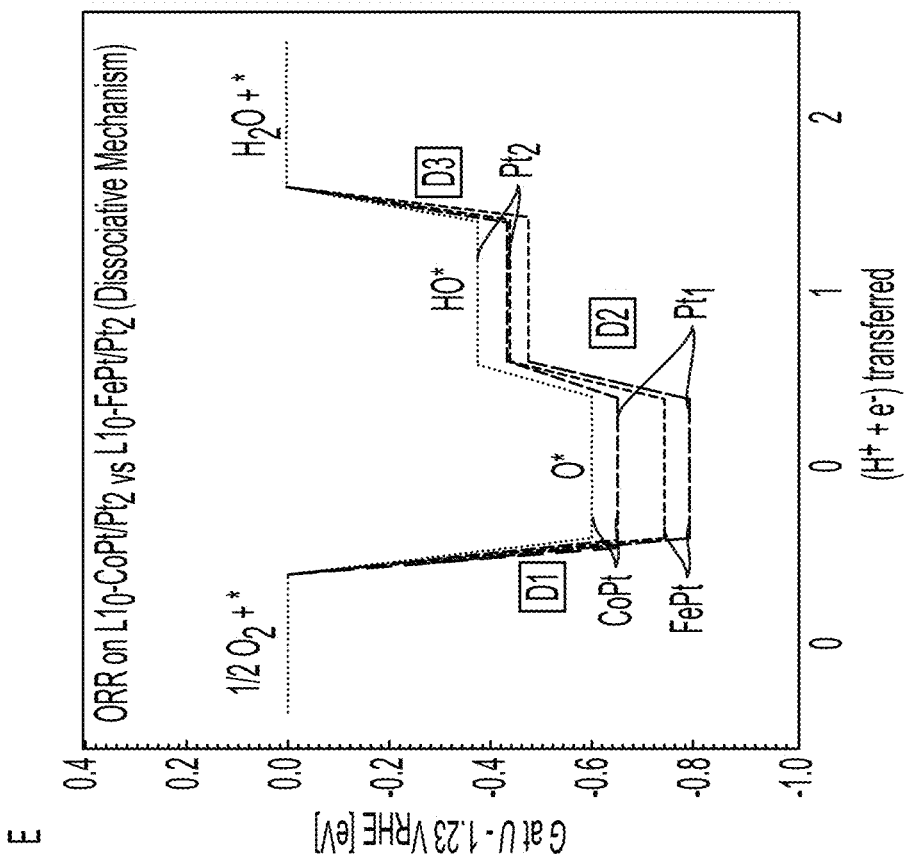

To understand the higher ORR performance of $L1_0$-CoPt/Pt than either $L1_0$-FePt/Pt or unstrained Pt, we used DFT to study ORR mechanisms via both associative and dissociative pathways on Pt (111), $L1_0$-CoPt/Ptx (111) and $L1_0$-FePt/Ptx (111) surfaces. In $L1_0$-MPt/Ptx, (M=Fe, Co), Pt overlayers were built in the same lattice of $L1_0$-MPt core to simulate the compressively strained Pt shell observed in experiments. Free energy landscapes at U=1.23 VRHE were constructed for both mechanisms (FIG. 5B-E). For associative mechanism at U=1.23 $V_{RHE}$ we observe that the formation of HOO* (A2) is uphill in free energy along with the protonation steps of 0* (A4) and HO* (A5) as shown in FIGS. 5B & D. For the dissociative mechanism the formation of 0* (D1) is downhill in free energy while the following two protonation steps of 0* (D2) and HO* (D3) are uphill in free energy diagrams as shown in FIGS. 5C & E. The overpotential (η) was associated with the step having the maximum uphill change in free energy, and is defined as $\eta=\Delta G_{PLS}/e$, where $\Delta G_{PLS}$ stands for change in the free energy for the potential limiting step. For all the systems considered we observe that the A2 is the potential limiting step for the associative mechanism while the D3 is the potential limiting step for dissociative mechanism.

The function of shell thickness in $L1_0$-CoPt/Ptx (x=1-3 Pt overlayers) was studied to investigate the influence of ligand effect. The free energy results on unstrained Pt (111) surface are consistent with the previously reported values. In FIGS. 5B & C, we observed that the free energies of all the intermediates on the $L1_0$-CoPt/Pt. (111) surface are raised compared to the unstrained Pt (111) surface for both mechanisms. The raised free energies indicate weakened binding of all intermediates on the $L1_0$-CoPt/Ptx (111) surface due to the compressive strain of Pt overlayers and/or ligand effect from Co underneath the surface, which lower the overpotentials dramatically compared to the unstrained Pt (111) surface in both associative and dissociative mechanisms. As we decreased the thickness of Pt overlayers in $L1_0$-CoPt/Ptx, we observed that the overpotential in dissociative mechanism is further reduced due to the amplified ligand effect in thinner Pt overlayers (FIG. 5C). However, the overpotential in associative mechanism increases as Pt overlayers become thinner (FIG. 5B), yet with less apparent changes. Note that the dissociative mechanism shows much lower overpotential for $L1_0$-CoPt/Ptx systems as compared to the associative mechanism, suggesting that the dissociative mechanism may dominate over the other. Also considering the scenario of real core/shell NPs, the surface layer typically has a high defect density of atoms and $L1_0$-CoPt/Pti is unable to stabilize the sub-surface Co atoms, resulting in the formation of Pt overlayers >1 layer thick under acidic condition. It can be predicted that the compressive strain effect and ligand effect from Co will gradually disappear when the Pt overlayer keeps growing thicker, leading to a surface more like pure Pt with higher overpotential. Hence, the trend observed suggests that the Pt shell of 2-3 overlayers in $L1_0$-CoPt/Ptx should lead to much lower overpotential compared to Al—CoPt where most Co is leached away, leading to the formation of a thick Pt shell under acidic condition.

Figure 5D:
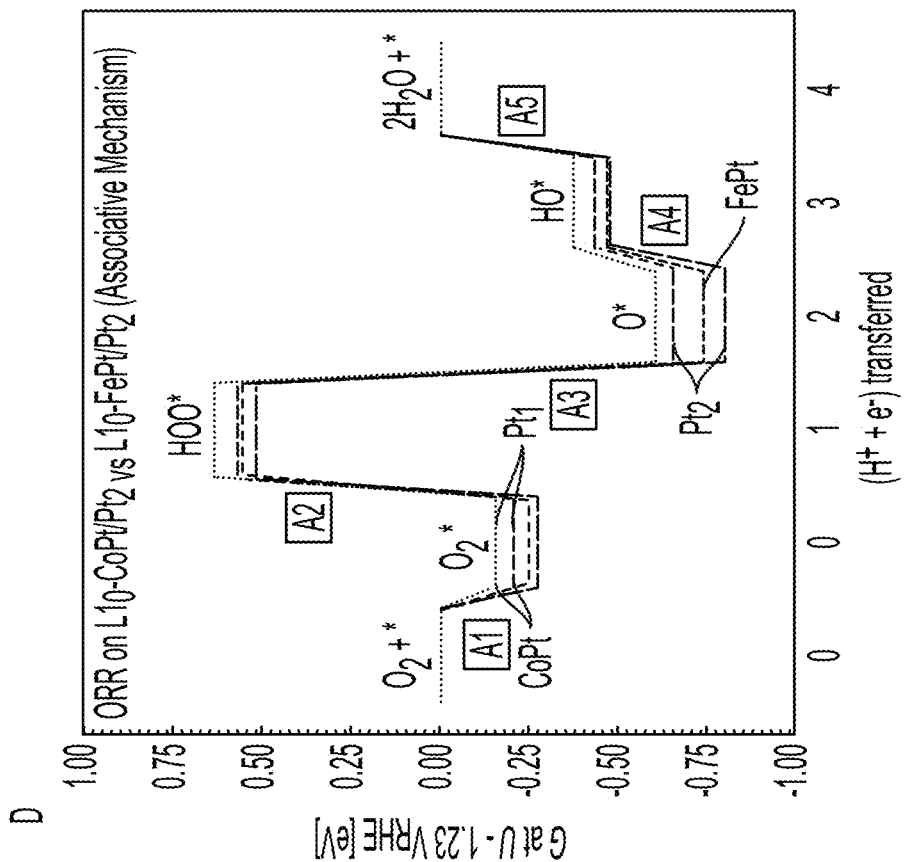

To investigate how $L1_0$-CoPt/Pt system compares with our previously reported $L1_0$-FePt/Pt with 2-3 atomic layers of Pt shell 14, we compared the free energy diagrams and overpotentials of $L1_0$-FePt/Ptx and $L1_0$-CoPt/Ptx (x=2-3 Pt overlayers) (FIGS. 5D and E). When the thickness of Pt overlayers is the same, we found that the binding of all the intermediates on Pt (111) surfaces are weakened by replacing Fe with Co in both mechanisms. The overpotentials involved in associative mechanism and in dissociative mechanism were calculated. This shows that Pt surface can be better tuned towards ORR catalysis by the strain and ligand effects of Co compared to Fe. We also calculated the compressive strains in the Pt (111) surface of $L1_0$-MPt/$Pt_x$ along the in-plane a and b directions. The $L1_0$-CoPt/$Pt_x$ surface has a −4.50% strain along <0-11> (a direction) and a −4.25% strain along <−110> (b direction). In comparison, the $L1_0$-FePt/$Pt_x$ surface has a −3.47% strain and a 2.23% strain, respectively. The modeling shows that $O_2$* binds along a direction which has a shorter Pt—Pt distance, implying that the shorter Pt—Pt distance in $L1_0$-CoPt/$P_x$ compared to $L1_0$-FePt/$Pt_x$ favors the $O_2$* adsorption. This suggests that Pt surface can be better tuned towards higher ORR activity by the combination of strain and ligand effects in $L1_0$-CoPt/Pt than in $L1_0$-FePt/Pt. The modelling agrees well with the experimental results in liquid half-cell test and MEA test, where $L1_0$-CoPt/Pt outperforms $L1_0$-FePt/Pt in the same testing conditions. In the liquid cell test, $L1_0$-CoPt/Pt shows a half-wave potential that is 0.28 V more positive than $L1_0$-FePt/Pt, and a MA that is 0.28 times of $L1_0$-FePt/Pt. In the MEA test, $L1_0$-CoPt/Pt shows superior MA both at BOL and EOL compared to $L1_0$-FePt/Pt.

These calculation results strongly bolster the experimental observations, shedding lights on the structural enhancement for ORR and the importance of Co stabilization to maintain the favored ligand effect in $L1_0$-CoPt/Pt. The ligand effect from sub-surface Co atoms further weakens binding of intermediates on the strained Pt overlayer surface and consequently reduces overpotentials, while it diminishes significantly if sub-surface Co atoms are leached out to form thick Pt shell.

In summary, the system of the present invention improves NP catalyst activity and stability for ORR under fuel cell conditions. It is based on a core/shell structured $L1_0$-CoPt/Pt NPs with a tetragonal intermetallic hard-magnet CoPt core and Pt shell in 2-atom thick Pt-shell. The structure was made by converting ~9 nm soft-magnet Al—CoPt into hard-magnet $L1_0$-CoPt (88% in ordering degree) followed by acid etching at 60° C. and 400° C. annealing. The $L1_0$-CoPt/Pt shows superior ORR activity and durability in the liquid half-cell test at 60° C.—its SA and MA are ~38 times and ~19 times respectively of those measured on comm Pt/C. This superior ORR performance translates into good MEA performance in fuel cells, demonstrating MA of 0.56 A/mgPt with only 19% MA loss after 30,000 ADT cycles at 80° C., exceeding the DOE 2020 targets set on both catalyst activity and durability. The high ORR performance of the $L1_0$-CoPt/Pt catalyst originates from its $L1_0$-ordering in the core structure and the thin (2-3 atom layer) Pt shell, which stabilize Co under fuel cell conditions, allowing for further optimization of oxygenated species-binding energetics on the compressed Pt surface (−4.50%/−4.25% biaxial strain). This $L1_0$-CoPt/Pt catalyst is a promising candidate for PEMFCs.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method for producing $L1_0$-CoPt/Pt catalyst nanoparticles, the method comprising:
   converting ~9 nm-soft-magnet A1-CoPt nanoparticles into a hard-magnet $L1_0$-CoPt;
   acid etching the hard-magnet $L1_0$-CoPt; and
   annealing the acid etched hard-magnet $L1_0$-CoPt to generate a $L1_0$-CoPt/Pt catalyst.

2. The method of claim 1, wherein the acid etching is comprising 0.1 M $HCLO_4$, in air, for 24 hours, at 60° C.

3. The method of claim 2, wherein the annealing is at 400° C.

4. The method of claim 3, wherein the $L1_0$-CoPt/Pt catalyst comprises:
   a core/shell structured $L1_0$-CoPt/Pt NPs with a tetragonal intermetallic hard-magnet CoPt core; and
   a Pt shell in 2-atom thick Pt-shell.

5. The method of claim 1, wherein the nanoparticles of soft-magnet A1-CoPt include an average dimension of 8.9+0.8 nm.

6. The method of claim 1, wherein the nanoparticles of soft-magnet A1-CoPt include a cashew-like shape.

* * * * *